(12) United States Patent
Johns et al.

(10) Patent No.: US 7,171,621 B1
(45) Date of Patent: Jan. 30, 2007

(54) REFORMATTING MESSAGES INTRODUCED INTO A USER INTERFACE

(75) Inventors: Christopher A. Johns, Warren, MI (US); Peter R. Kolbus, Northville, MI (US)

(73) Assignee: Compuware Corporation, Detroit, MI (US)

( * ) Notice: Subject to any disclaimer, the term of this patent is extended or adjusted under 35 U.S.C. 154(b) by 700 days.

(21) Appl. No.: 10/006,332

(22) Filed: Nov. 30, 2001

(51) Int. Cl.
*G06F 14/00* (2006.01)
*G06F 15/00* (2006.01)

(52) U.S. Cl. .................... 715/724; 715/748

(58) Field of Classification Search ............... 345/762, 345/764, 765, 746, 788; 715/765, 763, 853, 715/854, 835, 748, 788, 817, 724; 709/206, 709/210
See application file for complete search history.

(56) References Cited

U.S. PATENT DOCUMENTS 5,987,504 A * 11/1999 Toga .......................... 709/206
6,546,417 B1 * 4/2003 Baker ......................... 709/206
6,636,242 B2 * 10/2003 Bowman-Amuah ......... 345/764

* cited by examiner

*Primary Examiner*—Cao (Kevin) Nguyen
(74) *Attorney, Agent, or Firm*—Fenwick & West LLP

(57) ABSTRACT

Inbound messages are reformatted so that they are compatible with a user interface and database found in a local area network. Local software provides a user interface with a message display area. The format of the area includes parameters such as line length and displayable lines. A user receives a message by electronic mail, copies it, and attempts to paste it into the message display area. The message is automatically reformatted according to the parameters of the message display area format. This displays the message without distortion and impediment upon other elements of the interface. The reformatted message can also be saved in the database and will appear in the correct format when it is retrieved.

40 Claims, 7 Drawing Sheets

REFORMATTING MESSAGES INTRODUCED INTO A USER INTERFACE

BACKGROUND OF THE INVENTION

1. Field of the Invention

This invention relates generally to reformatting data, and more particularly to reformatting messages introduced into a user interface.

2. Description of the Related Art

Customer service often involves numerous customer service representatives who receive and respond to communications from customers. These representatives often operate computer workstations to assist their response.

The workstations are typically connected in a network having a centralized database of customer service information. Software based systems manage customer responses and provide interfaces for entering information about customer communications into the database. A customer can contact the customer service representative and orally convey a message. The representative then enters the message into the database by invoking a data entry screen (user interface) with a message display area and typing the message into the message display area. Typing messages directly into the user interface works fairly well as the customer service representative controls the format of the entered text.

Customer service has been migrating to new forms of communication to complement or substitute for traditional telephone conversations between representatives and customers. Among these forms of communication is electronic mail, which can arrive at a customer service representative's workstation through the Internet or the like. Unfortunately, these electronic mails can have a variety of formats and the communications received via electronic mail will not necessarily integrate with interfaces and databases provided by the customer response system.

Merely copying text from a received electronic mail into an operating system clipboard, and pasting the text into a user interface provided by a customer service system does not remedy the potential incompatibility between the formats received text and the user interface. Rather, pasting copied text typically displays individual words split across lines, and longer lines as an erratic series of full and truncated lines. This makes the message much more difficult to read.

Additionally, long messages do not cause a message display region in the user interface to scroll or otherwise account for the presence of additional text. Instead, portions of the pasted message spill into other data entry regions on the user interface.

To remedy the above, the customer service representative must substantially edit the pasted message to make it compatible with the format of the user interface.

Thus, there remains a need to automatically reformat copied electronic messages to provide compatibility with interfaces and databases having formats that differ from those of the copied messages.

SUMMARY OF THE INVENTION

The described embodiments of the present invention automatically reformat messages to provide compatibility with interfaces and databases provided by a local system. Reformatted messages are displayed in a user interface in concise, readable and complete form.

One embodiment of the present invention reformats inbound electronic mail messages so that they are compatible with a customer response system user interface and database found in a local area network. The user interface includes a message display area with a format having parameters such as a line length and a number of displayable lines. A representative receives a customer message by electronic mail and copies it using conventional operations. The representative navigates to the user interface and attempts to paste the copied message into the message display area. The copied message and message display area formats differ, such that introduction of the copied message unmodified would produce a misalignment according to the display parameters. According to one aspect of the present invention, the copied message is automatically reformatted to correspond with the format of the message display area, and is therefore displayable in conformity with its particular display parameters.

Another embodiment of the present invention automatically reformats the copied message by obtaining the line length parameter of the message display area and re-flowing the copied message to produce a reformatted message having lines that correspond to the line length.

The message is preferably re-flowed by iteratively populating reformatted message lines with words from the copied message. The reformatted message line number is incremented when introduction of a word would exceed the line length. Where a line from the copied message is exhausted prior to filling a reformatted line, the copied line is examined to determine how to format the termination of the current line and the origination of the next line in the reformatted message. Where a new paragraph is not found, a current reformatted line continues to be populated with words from a next line in the copied message. Otherwise, desired new paragraph formatting is inserted and the next line in the copied message is used to populate a new reformatted message line. Other formatting including bullets, tabs, and numbering is also preferably retained. The processing of the copied message continues until all of its lines are reformatted. The entire reformatted message thus conforms to the display features found in the destination user interface.

The maximum number of available display lines is also accommodated in another aspect of the present invention. The line count of the reformatted message is maintained, and when it exceeds that of the user interface display parameters, an overflow process is invoked.

Other aspects of the present invention also recognize whether the representative is seeking to introduce the copied message into the appropriate entry screen, and determine whether the proper database mode is available for saving an introduced message.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
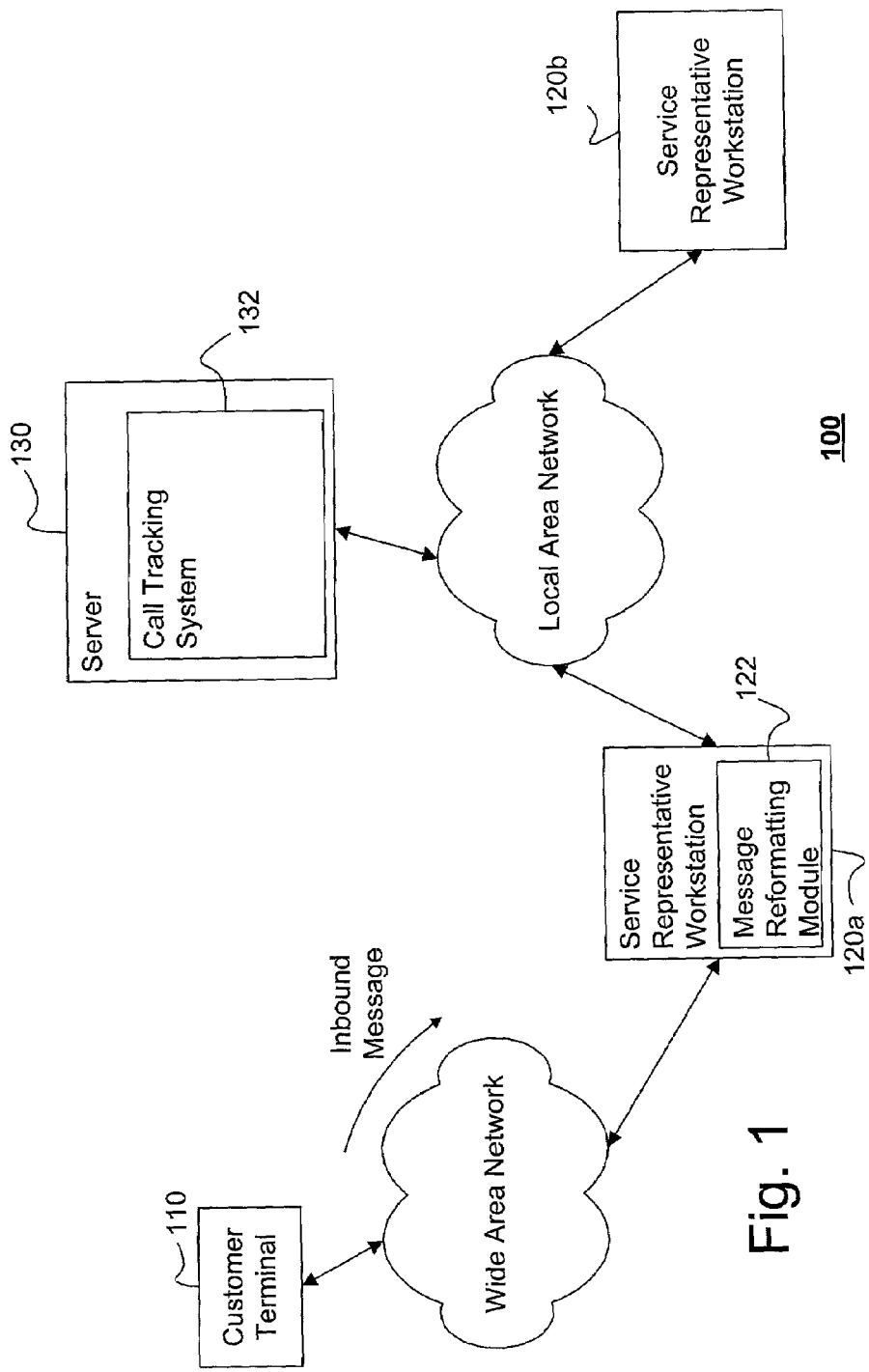
FIG. 1 is a schematic diagram illustrating a system including an embodiment of message reformatting according to the present invention.

The schematic diagram of FIG. 1 illustrates a system 100 including an embodiment of message reformatting in accordance with the present invention. The system 100 includes a plurality of service representative workstations 120a, 120b and a server 130 connected in a local area network (LAN) in conventional fashion. The server 130 includes a call tracking system (CTS) 132 that manages responses to customer service related calls. The CTS 132 is an example of a customer service system. The CTS 132 includes a database of information regarding contacts with customers. Customer service representatives input information to the CTS 132 using a user interface displayed at their workstations 120a, 120b. The information is sent to the server 130 through the LAN connection and is stored in the database. The user interface and the corresponding database entries have a particular format.

The representatives receive customer information and enter it into the user interface using conventional tools. For example, a customer service representative receives telephonic communications from customers and types information into an appropriate field within the user interface. Information is also received through other channels. A customer terminal 110 such as a personal computer allows the customer to send messages to the customer service representative through a wide area network (WAN) such as the Internet. These messages are referred to as electronic messages. Electronic messages include e-mails, which are sent using the Simple Mail Transfer Protocol (SMTP). An electronic message arrives at the service representative workstation 120a but is not directly imported into the CTS 132. Rather, the customer service representative reads the electronic message, copies the message into an operating system clipboard, and pastes the message into a message display area provided by the CTS 132 user interface. The format of the copied message typically differs from that of the message display area, so its display therein would be variously misaligned.

The copied message is automatically reformatted for the CTS 132 user interface according to the present invention. A message reformatting module 122 receives the copied message and parameters for a CTS 132 user interface message display area. An API call made to the OS retrieves the contents of the clipboard (the copied message) into memory. The copied message is then reformatted according to those parameters. The resulting reformatted message is aligned with the message display area, retains other, desired original message formatting, and does not distort the CTS 132 user interface.

Preferred reformatting parameters include line length and number of lines. The copied message is re-flowed such that the line breaks in the reformatted message correspond to the line length of the message display area. The re-flowing process prevents words from inappropriately splitting across lines and lines from being truncated as would typically occur with a conventional procedure.

The message display area is also filled until the number of lines in the reformatted message reaches a maximum defined by the "number of lines" parameter. An overflow procedure, which is invoked where the maximum is exceeded, prevents distortion of the display field or overflow of inbound text into inappropriate fields.

Finally, bullets, tabs, numbering and paragraph breaks are handled so that they are consistent with the format of the copied message, so that in desired aspects the reformatted message displays consistently with the originating display (e.g., the e-mail display screen). The contents of the clipboard, referred to as the copied message, are generally interpreted as a stream of text. Features including tabs, bullets and paragraph breaks are special characters that are found in the stream using conventional codes and techniques for identifying characters. The message reformatting module 122 recognizes these special characters and provides a corresponding translation appropriate to the character and its context within the copied message. For example, a series of lines starting with a bullet, followed by a tab, followed by text is detected and the lines are consistently displayed within the reformatted message. The reformatted message thus conforms to the display parameters of the CTS 132 user interface and retains the desirable characteristics of the original message.

Figure 2:
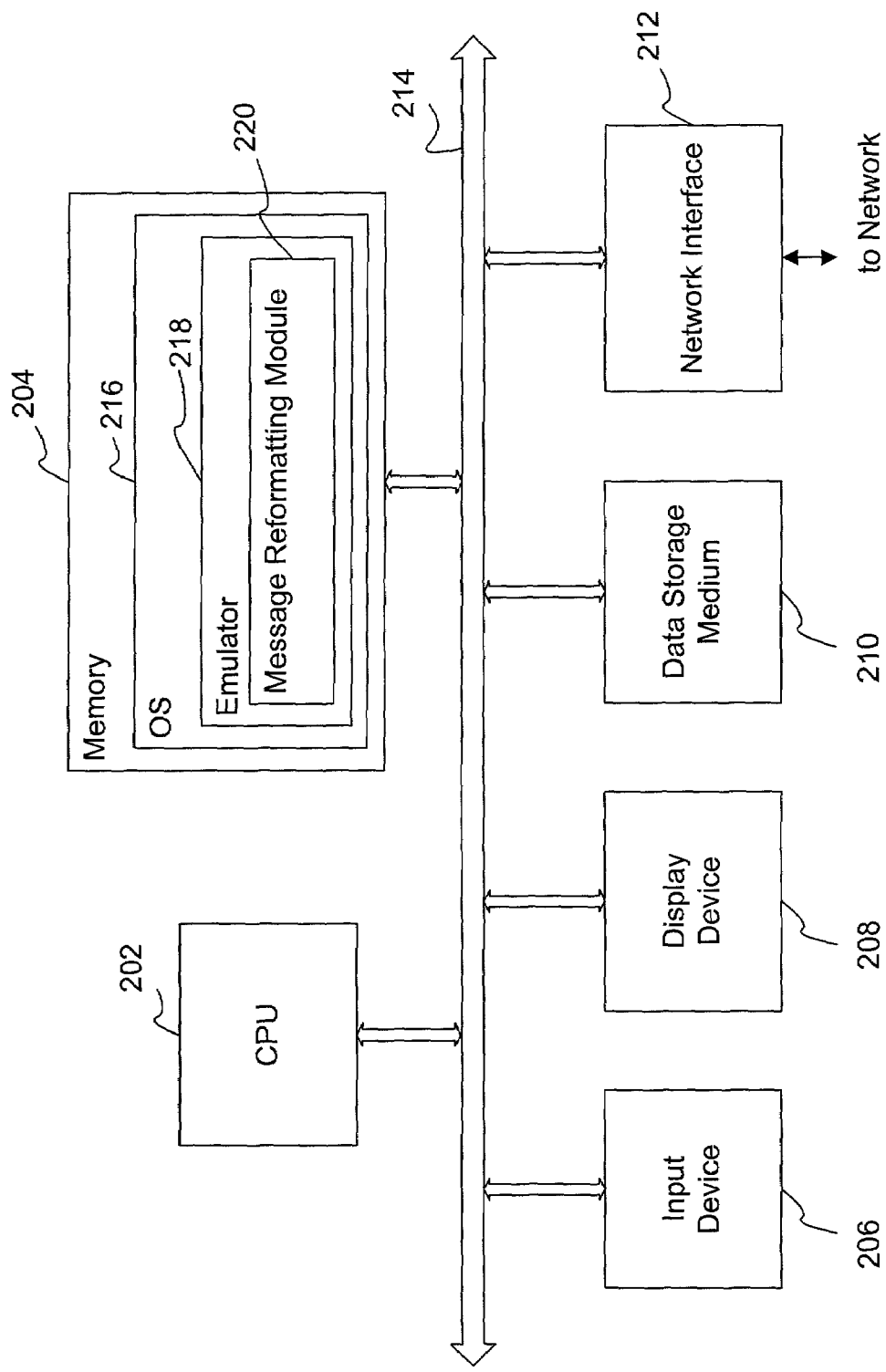
FIG. 2 is a schematic diagram illustrating an embodiment of a workstation in accordance with the present invention.

FIG. 2 illustrates an embodiment of a workstation 200 configured in accordance with the present invention. The workstation 200 includes a CPU 202, memory 204, input device 206, display device 208, data storage medium 210 and network interface 212 interconnected by a bus 214 in conventional fashion.

The CPU 202 executes instructions such as those provided in memory 204 to provide various functionalities, often in conjunction with other elements of the system. A data storage medium 210 provides non-volatile data storage, and is preferably a magnetic or magneto-optic hard disk device. The input device 206 and display device 208 are conventional, and respectively facilitate user input (e.g., key and/or mouse) and visual displays through which the user interfaces with the workstation 200. The network interface 212 is a conventional interface for providing network connectivity.

The memory 204 further includes an operating system (OS) 216 an emulator 218 and a message reformatting module 220. The OS 216 manages programs such as applications and includes instructions and operations that can be used by the applications, either directly or through an application program interface. The OS 216 also handles exchanges to and from devices connected to the system (e.g., printers, disk drives, etc.), manages memory use, and allocates computing resources in multitasking environments. The OS 216 can be Microsoft Windows NT 4.0™, Microsoft Windows 98™, or any conventional operating system.

The emulator 218 provides a customizable interface through which the workstation 200 communicates with various different local and network connected host systems. For example, the emulator 218 provides a graphical user interface for exchanging information with the CTS 132. A preferred emulator 218 is the EXTRA!® Personal Client provided by Attachmate Corporation of Bellevue, Wash. The ordinarily skilled artisan will recognize the alternatives for the workstation 200 elements, the OS 216, and the emulator 218.

Figure 3:
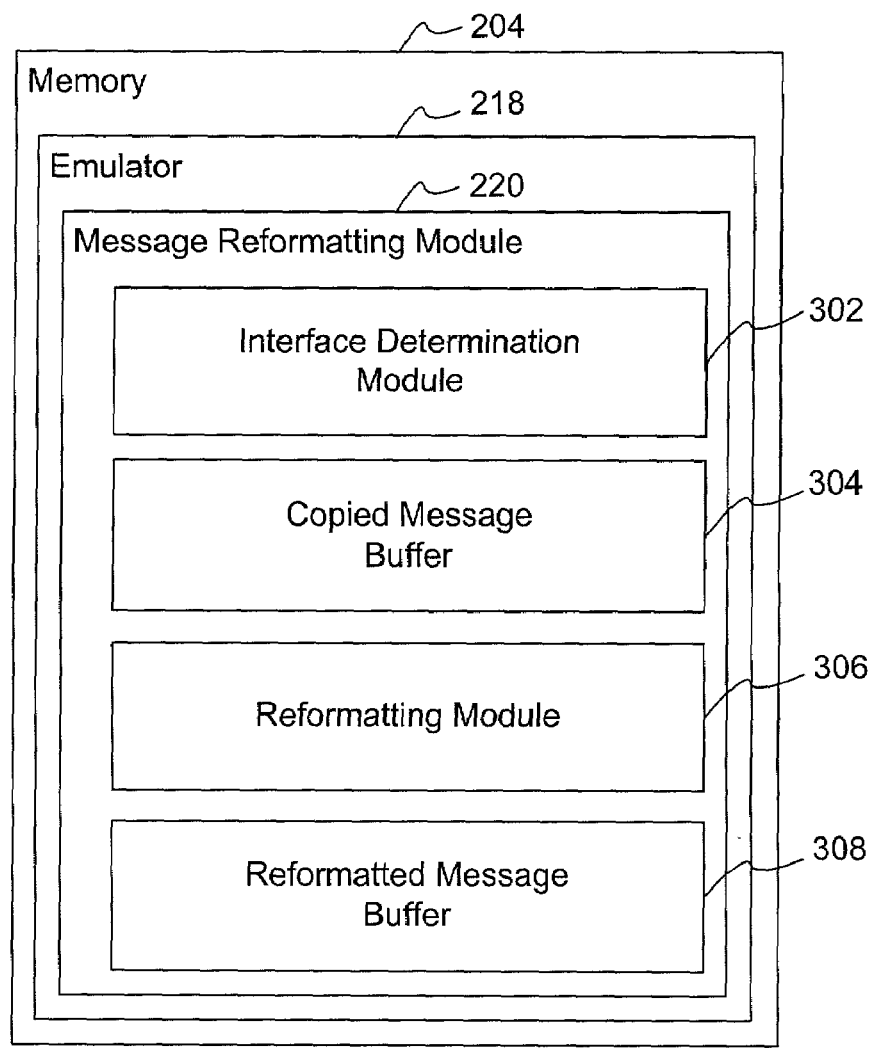
FIG. 3 is a block diagram illustrating an embodiment of a message reformatting module in accordance with the present invention.

The emulator 218 is customized to include a message reformatting module 220 in accordance with the present invention. The message reformatting module 220 may be variously configured, but comprises instructions particular to the emulator 218 in the form of a macro in one embodiment. FIG. 3 illustrates an embodiment of a message reformatting module 220 in accordance with the present invention. The message reformatting module 220 includes an interface determination module 302, a copied message buffer 304, a reformatting module 306 and a reformatted message buffer 308.

The interface determination module 302 identifies an attempt to introduce (e.g., paste) a copied message into an emulator user interface and determines whether the user interface is appropriate for the copied message. The copied message buffer 304 receives and stores the copied message. The parameter identification module 304 stores display parameters for the message display field found in the CTS user interface. These parameters are preferably obtained from the emulator, which has default and customizable display settings as described. The reformatting module 306 includes routines for reformatting the copied message to produce a reformatted message having display parameters that conform to those in the CTS user interface message display area. The reformatted message buffer 308 stores this resulting reformatted message, which can in turn be saved in the CTS database. The saved message remains appropriately formatted for subsequent display in CTS operations.

The ordinarily skilled artisan will recognize alternative modularizations for the message reformatting module 220 with similar operations. The display diagram of FIG. 4 and the flow diagrams of FIGS. 5, 6A and 6B further illustrate the functionality of the message reformatting module 220 (MRM).

Figure 4:
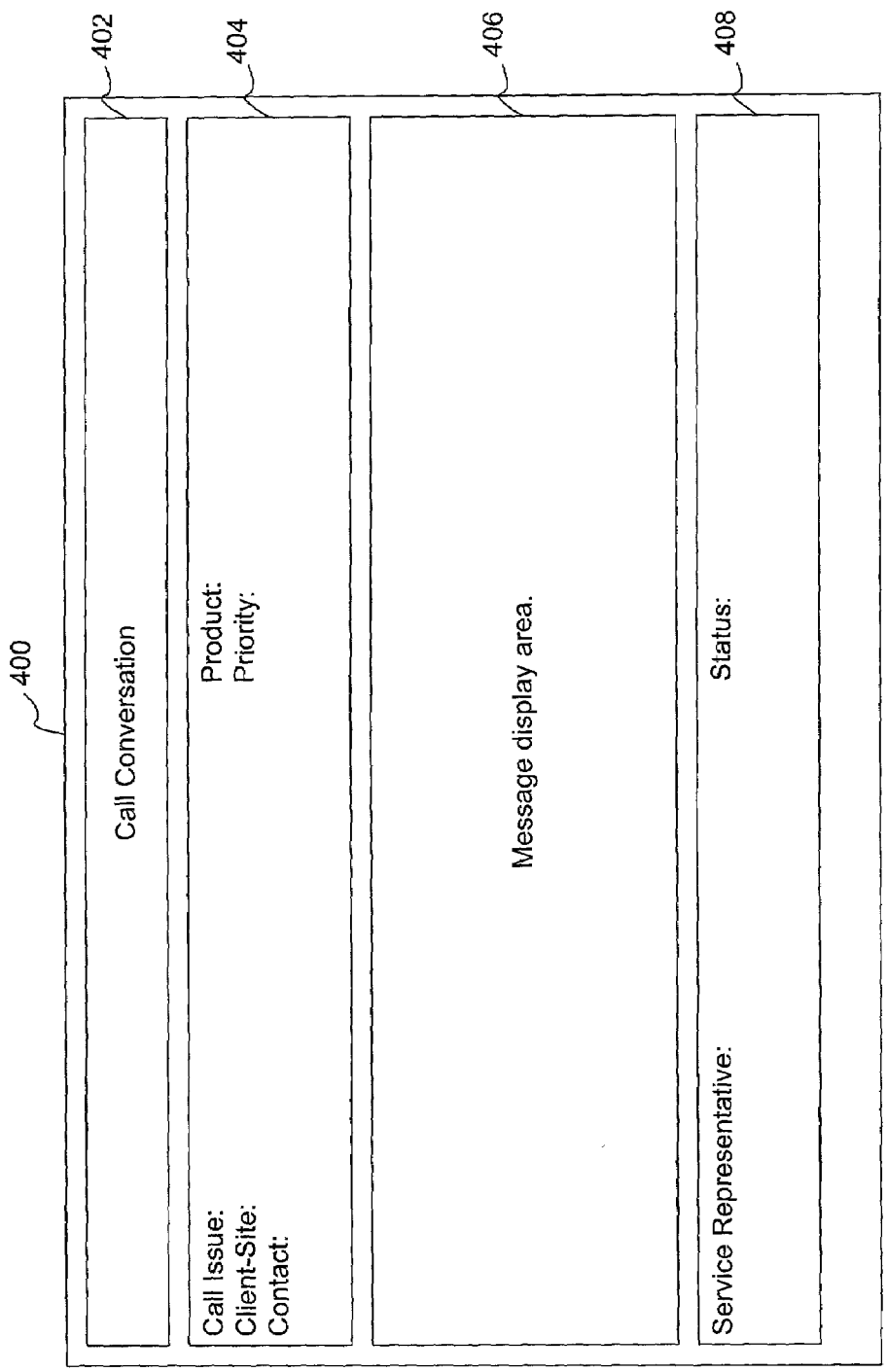
FIG. 4 is a diagram illustrating an embodiment of a user interface including a message display area.

FIG. 4 illustrates an embodiment of a user interface display 400 including header 402, issue identification 404, message display 406 and service response 408 areas. The header area 402 identifies the user interface and includes menu headings that assist in various operations. For a particular CTS user interface the header area 402 displays the name of the user interface (e.g., the "Call Conversation" screen) and menu headings such as "file", "options" and "help" (not shown). The issue identification area 404 includes fields for identifying the issue ("Call Issue"), the customer ("Contact", "Client-site"), and the product. Other fields such as an assigned "priority" for the matter can be provided.

The service response area 408 identifies the customer service representative who addresses the customer service matter. Where multiple representatives address the matter, their contribution can be displayed. For example, the initiator of the entry into the CTS, and various responsible representatives can be displayed in this area (not shown in FIG. 4). The "status" of a matter is also displayed. This includes information about contacts, callback schedules, and the like.

The message display area 406 receives typed or reformatted messages in accordance with the present invention. The message display area 406 has display parameters including a line length and a number of display lines. As described previously, conventional pasting of copied text into the message display area would cause display distortions including truncated lines, words split across lines, and loss of desired formatting such as tabs and numbering. Additionally, where the copied message produces more lines than the number of display lines, the message display area 406 becomes distorted and text carries over into other display areas such as the service response area 408.

Figure 5:
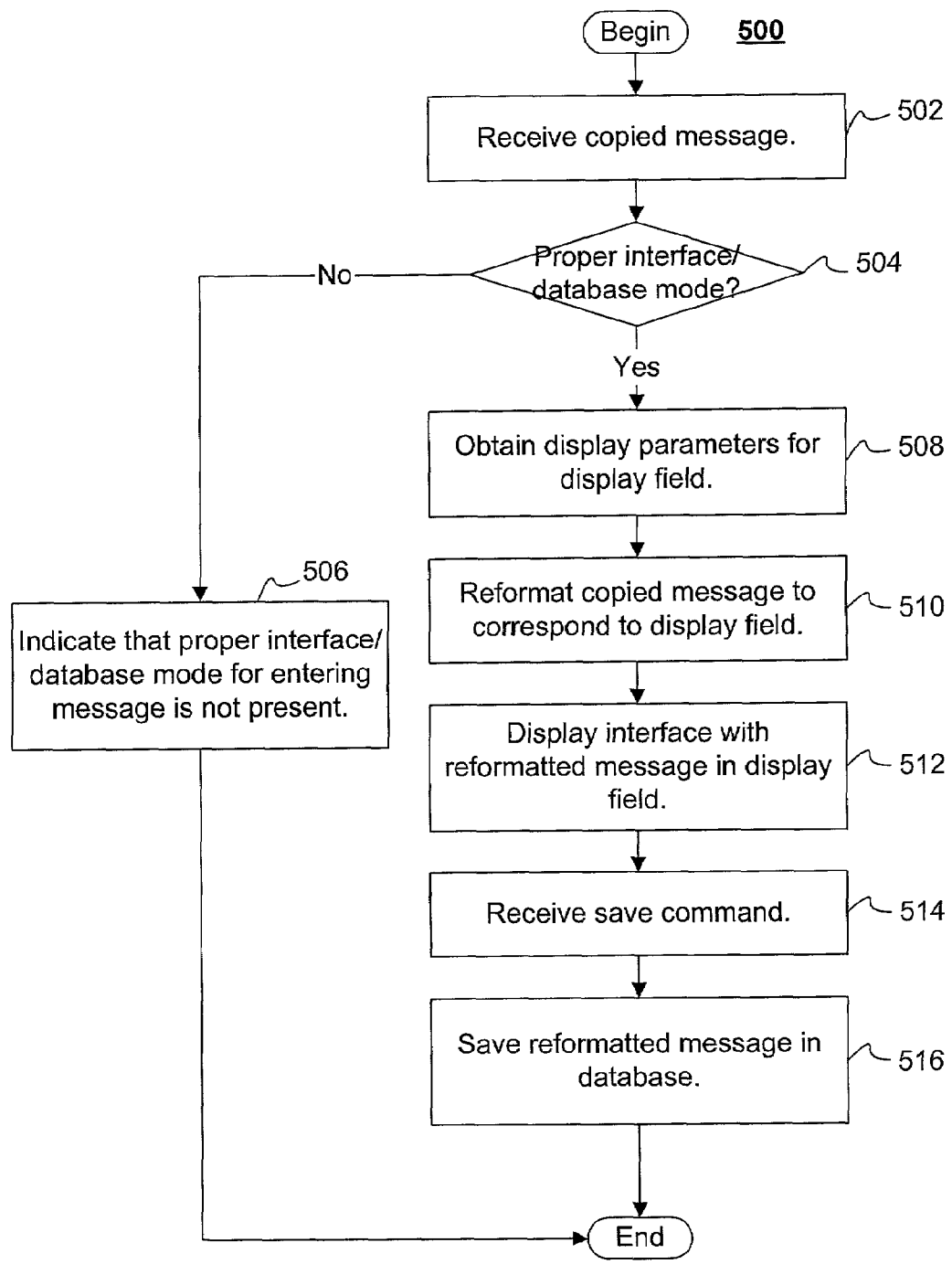
FIG. 5 is a flow diagram illustrating an embodiment of reformatting copied messages in accordance with the present invention.

The flow diagram of FIG. 5 illustrates an embodiment of a method for reformatting messages in accordance with the present invention. A customer service representative receives e-mail from a customer. The representative displays a message found in the e-mail, highlights the message using a displayed cursor and mouse, and copies the message into a clipboard, all in conventional fashion. The customer service representative then navigates to a CTS user interface provided by the emulator and attempts to paste the copied message into a display field using a conventional control signal. The copied message is thus received (502) for processing.

The MRM next determines (504) whether the customer service representative targeted the proper user interface and corresponding database access mode in seeking to introduce the copied message. In one embodiment this is accomplished by determining whether the current screen includes text identifying it as an update mode screen. Determination of the presence of such text indicates a proper interface, and absence of the text indicates an improper interface. The identifying text will vary dependent upon the systems and interfaces with which the MRM operates. Where the user interface is improper, the MRM indicates (506) that the proper interface or database mode for entering the message is not present by causing an error message or the like to be displayed. The customer service representative can then navigate to the appropriate interface and repeat the paste operation.

If the proper interface is displayed, then the copied message is retained in the copied message buffer and the display parameters for the message display field are obtained (508). The display parameters include the line length and the number of available display lines. One embodiment operates with a line length of 75 characters and 7 lines with the message display field positioned at a fixed location within the emulator display. The copied message is automatically reformatted (510) to provide a reformatted message that corresponds with the format of the message display field, and is therefore displayable in conformity its display parameters. This is accomplished by re-flowing the text in the copied message such that truncated lines are removed and words are not split across lines. An embodiment of reformatting the copied message is described in further detail in FIGS. 6A and 6B, discussed below.

The reformatted message is retained in the reformatted message buffer and displayed (512) within the message display area. From this mode, the customer service representative views the message, appropriately formatted. Overflow text in the reformatted message (that which extends beyond the maximum number of display lines) is also accounted for so that there is no encroachment of areas adjacent to the message display area. The overflow text may be viewed using conventional function key or scroll bar related operations. The treatment of reformatted messages that exceed the maximum number of display lines is also described further in FIGS. 6A and 6B.

The customer service representative can save the reformatted message into the CTS database from the user interface using conventional control signals. Preferably, the presence of the proper database access mode was detected along with the determination of the appropriate interface as described previously. Alternatively, it can be checked at this stage. After the save command is received (514) the reformatted message is saved (516) in the database.

Figure 6A:
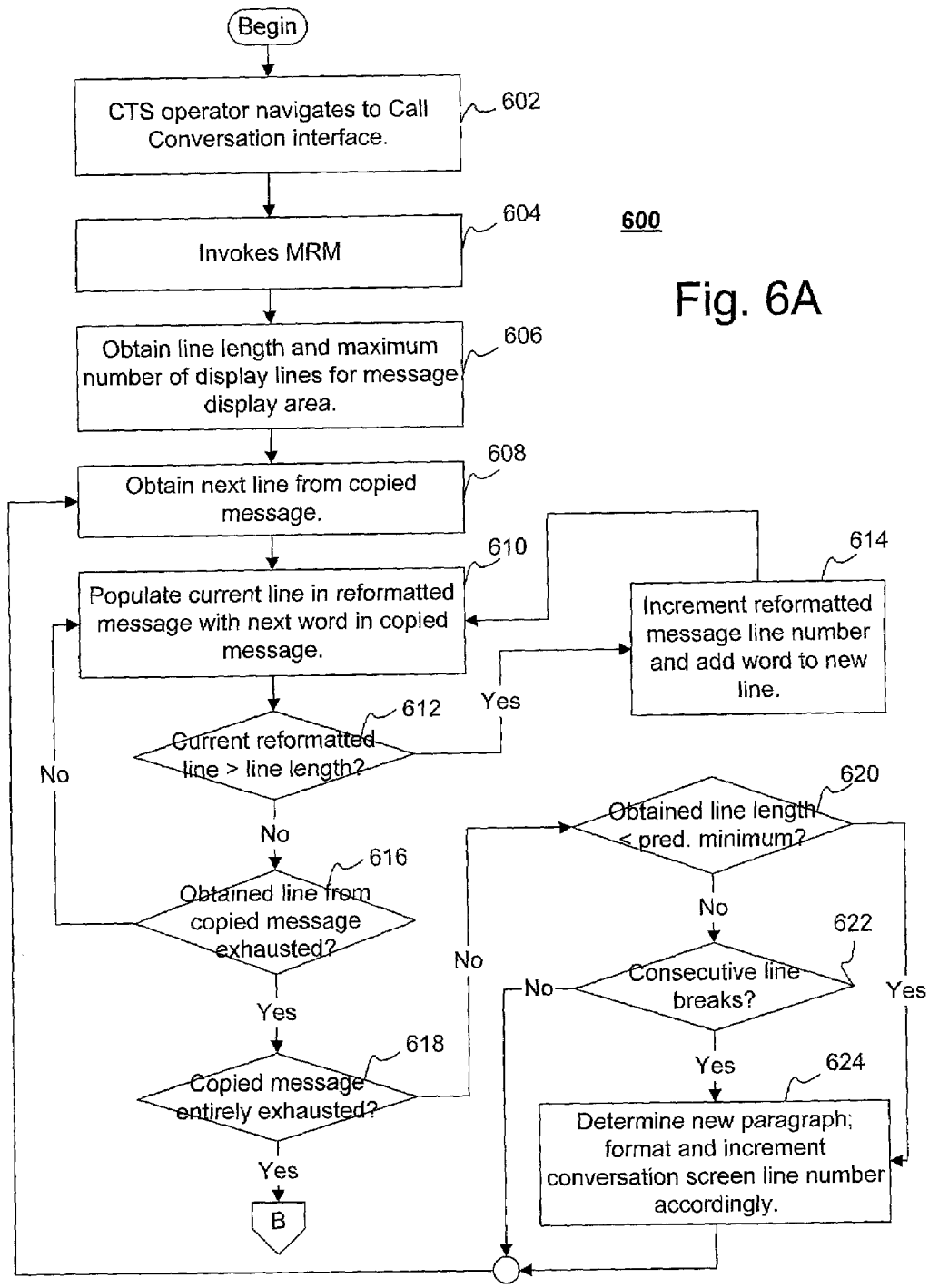
FIGS. 6A and 6B are flow diagrams illustrating another embodiment of reformatting copied messages in accordance with the present invention.
Figure 6B:
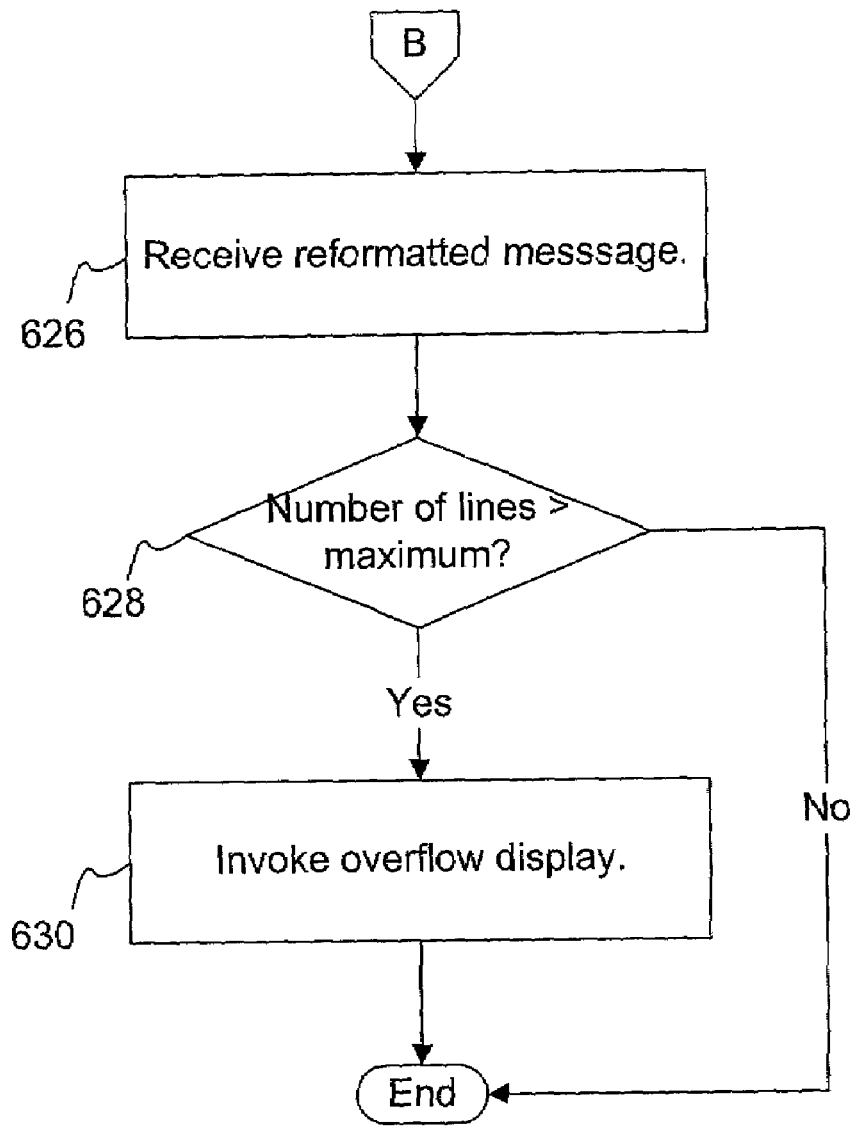

The flow diagrams of FIGS. 6A–6B illustrate an embodiment of reformatting a message in more detail. A customer service representative receives e-mail from a customer and copies a message in the e-mail into the clipboard as described. The customer service representative then navigates (602) to the CTS Call Conversation screen and invokes (604) the MRM to bring the message into the screen's message display area. This may be prompted by an attempt to paste the copied message into the message display area.

The MRM obtains (606) the line length and the maximum number of display lines in the message display area. In one embodiment, the size and position of the message display area are predetermined and readily obtainable. These values can be varied in setting up the message display area or the like. The MRM also locates the end of any current message in the message display area before introducing the copied message into the message display area, to preserve preexisting information. Lines from the message that was already in the message display area are accounted for in subsequent processing of the overall message.

The MRM then re-flows the copied message to produce a reformatted message that conforms to the message display area. The copied message and the reformatted message are retained in their respective buffers. The MRM obtains (608) the next line in the copied message and populates (610) the current line in the reformatted message. Initially this means that the MRM populates the first line in the reformatted message with the first line in the copied message. Population of the current line in the reformatted message continues on determinations that the current line in the reformatted line does not exceed the line length (612) and the line obtained from the copied message is not exhausted (614).

In determining (612) whether the reformatted line exceeds the line length, the MRM tracks the number of characters used in populating the current line in the reformatted message and adds the number of characters that would be introduced by the next word in the copied message. The MRM increments (614) the reformatted message line number so that a new line can be populated when the additional word would cause the current line to exceed the line length. The word is then added to the new line instead of the previous line. This prevents splitting of words across lines but fills each line in the reformatted message to its maximum extent.

The MRM then populates the (new) current line in the reformatted message in the same fashion until it determines (616) that the line obtained from the copied message is exhausted (e.g., out of words).

Where a line from the copied message is exhausted prior to filling a reformatted line, the copied line is examined to determine how to format the termination of the current line and the origination of the next line in the reformatted message. If a completed current line from the copied message is not less than a predetermined minimum (620) and consecutive line breaks are not present (622), then the MRM continues to populate the current line in the reformatted message with a next line in the copied message. The MRM obtains (608) the next line from the copied message and continues populating (610) the current line in the reformatted message as indicated. This places the first word in the next line of the copied message on the current line in the reformatted message, provided that the line length would not be exceeded as described previously.

If the MRM determines (620) the copied message line to be less than the minimum or detects (622) consecutive line breaks, then the MRM determines that a new paragraph exists in the copied message, formats the reformatted message by inserting a line break after the last word in the reformatted message, and increments the line number accordingly (624).

The above cycle of obtaining lines from the copied message and re-flowing their text into the reformatted message continues until all of the lines in the copied message are exhausted. When the MRM determines (618) that the copied message is entirely exhausted the generation of the reformatted message is completed. The reformatted message remains in the reformatted message buffer.

The reformatted message is preferably examined to detect an overflow condition prior to its display. Referring now to FIG. 6B, the MRM receives (626) the reformatted message and determines (628) whether the number of lines in the reformatted message exceeds the maximum number of lines available in the message display area. This is accomplished by recounting the lines, or, alternatively, obtaining the line count from the previously described reformatting procedure. Where the line count exceeds the maximum, the overflow display is invoked (630) to prevent distortion of the message display area and overflow into other display areas on the Call Conversation user interface. By default, where an overflow exists, the initial portion of the reformatted message is displayed (lines one through the maximum display number). Additional lines can be viewed using conventional operations.

The reformatted message is displayed in the Call Conversation user interface and can be saved into the CTS database by the customer service representative. The new formatting is retained so that it will consistently display correctly in subsequent retrievals of the message.

Thus, automatically reformatting introduced messages to conform to corresponding message display fields in a user interface is provided in accordance with the present invention. Although the present invention has been described in considerable detail with reference to certain embodiments thereof, other embodiments are possible. Therefore, the sprit and scope of the appended claims should not be limited to the description of the embodiments contained herein.

The invention claimed is:

1. A method for reformatting messages for multiple display environments, the method comprising:
   determining a visual presentation of a user interface including a message display area having a first visual format that includes a first display parameter;
   receiving a message for display within the message display area, the message having a second visual format that differs from the first visual format such that displaying the message unmodified would generate a misalignment according to the first display parameter;
   automatically reformatting the message to generate a reformatted message that conforms with the first visual format; and
   displaying the reformatted message within the message display area, wherein the displayed reformatted message conforms to the first display parameter.

2. The method of claim 1, wherein the first visual format further includes a second display parameter, and the displayed reformatted message conforms to the first display parameter and the second display parameter.

3. The method of claim 2, wherein the first display parameter is a line length and the second display parameter is a maximum number of display lines.

4. The method of claim 3, wherein automatically reformatting comprises:
   receiving the line length and the maximum number of display lines; and
   re-flowing the message to provide a reformatted message having lines that correspond to the line length.

5. The method of claim 4, wherein re-flowing the message comprises:
   populating a current reformatted line within the reformatted message with a current line from the message; and
   incrementing to a next reformatted line where insertion of an additional word from the current line would cause the current reformatted line to exceed the line length.

6. The method of claim 5, wherein re-flowing the message further comprises:
   continuing to populate the current reformatted line with a next line from the message where the current line is exhausted before the current reformatted line exceeds the line length.

7. The method of claim 6, wherein re-flowing the message further comprises:
   determining a paragraph break where the current line is exhausted and the current line is less than a predetermined minimum length.

8. The method of claim 6, wherein re-flowing the message further comprises:
   determining a paragraph break where the current line is exhausted and a double line break is found before the next word in the message.

9. The method of claim 1, wherein the user interface is included in a network based customer service system and the reformatted message is saved in a database used by the network based customer service system.

10. The method of claim 1, wherein the first display parameter corresponds to one of a bullet character, tab character and paragraph break.

11. A computer readable storage medium that stores a set of software instructions, which are executable to reformat messages for multiple display environments, the instructions comprising:
    determining a visual presentation of a user interface including a message display area having a first visual format that includes a first display parameter;
    receiving a message for display within the message display area, the message having a second visual format that differs from the first visual format such that displaying the message unmodified would generate a misalignment according to the first display parameter;
    automatically reformatting the message to generate a reformatted message that conforms with the first visual format; and
    displaying the reformatted message within the message display area, wherein the displayed reformatted message conforms to the first display parameter.

12. The storage medium of claim 11, wherein the first visual format further includes a second display parameter, and the displayed reformatted message conforms to the first display parameter and the second display parameter.

13. The storage medium of claim 12, wherein the first display parameter is a line length and the second display parameter is a maximum number of display lines.

14. The storage medium of claim 13, wherein automatically reformatting comprises:
    receiving the line length and the maximum number of display lines; and
    re-flowing the message to provide a reformatted message having lines that correspond to the line length.

15. The storage medium of claim 14, wherein re-flowing the message comprises:
    populating a current reformatted line within the reformatted message with a current line from the message; and
    incrementing to a next reformatted line where insertion of an additional word from the current line would cause the current reformatted line to exceed the line length.

16. The storage medium of claim 15, wherein re-flowing the message further comprises:
    continuing to populate the current reformatted line with a next line from the message where the current line is exhausted before the current reformatted line exceeds the line length.

17. The storage medium of claim 16, wherein re-flowing the message further comprises:
    determining a paragraph break where the current line is exhausted and the current line is less than a predetermined minimum length.

18. The storage medium of claim 16, wherein re-flowing the message further comprises:
    determining a paragraph break where the current line is exhausted and a double line break is found before the next word in the message.

19. The storage medium of claim 11, wherein the user interface is included in a network based customer service system and the reformatted message is saved in a database used by the network based customer service system.

20. The method of claim 11, wherein the first display parameter corresponds to one of a bullet character, tab character and paragraph break.

21. An apparatus for reformatting messages for multiple display environments, the apparatus comprising:
    an interface determination module, configured to determine a visual presentation of a user interface including a message display area having a first visual format that includes a first display parameter;
    a message buffer, configured to receive a message for display within the message display area, the message having a second format that differs from the first visual format such that displaying the message unmodified would generate a misalignment according to the first display parameter; and
    a reformatting module, in communication with the interface determining module and the message buffer, configured to automatically reformat the message to generate a reformatted message that conforms with the first visual format, for displaying the reformatted message within the message display area, wherein the displayed reformatted message conforms to the first display parameter.

22. The apparatus of claim 21, wherein the first visual format further includes a second display parameter, and the displayed reformatted message conforms to the first display parameter and the second display parameter.

23. The apparatus of claim 22, wherein the first display parameter is a line length and the second display parameter is a maximum number of display lines.

24. The apparatus of claim 23, wherein automatically reformatting comprises:
    receiving the line length and the maximum number of display lines; and
    re-flowing the message to provide a reformatted message having lines that correspond to the line length.

25. The apparatus of claim 24, wherein re-flowing the message comprises:
    populating a current reformatted line within the reformatted message with a current line from the message; and incrementing to a next reformatted line where insertion of an additional word from the current line would cause the current reformatted line to exceed the line length.

26. The apparatus of claim 25, wherein re-flowing the message further comprises:
continuing to populate the current reformatted line with a next line from the message where the current line is exhausted before the current reformatted line exceeds the line length.

27. The apparatus of claim 26, wherein re-flowing the message further comprises:
determining a paragraph break where the current line is exhausted and the current line is less than a predetermined minimum length.

28. The apparatus of claim 26, wherein re-flowing the message further comprises:
determining a paragraph break where the current line is exhausted and a double line break is found before the next word in the message.

29. The apparatus of claim 21, wherein the user interface is included in a network based customer service system and the reformatted message is saved in a database used by the network based customer service system.

30. The method of claim 21, wherein the first display parameter corresponds to one of a bullet character, tab character and paragraph break.

31. An apparatus for reformatting messages for multiple display environments, the apparatus comprising:
means for determining a visual presentation of a user interface including a message display area having a first visual format that includes a first display parameter;
means for receiving a message for display within the message display area, the message having a second visual format that differs from the first visual format such that displaying the message unmodified would generate a misalignment according to the first display parameter; and
means for automatically reformatting the message to generate a reformatted message that conforms with the first visual format, for displaying the reformatted message within the message display area, wherein the displayed reformatted message conforms to the first display parameter.

32. The apparatus of claim 31, wherein the first visual format further includes a second display parameter, and the displayed reformatted message conforms to the first display parameter and the second display parameter.

33. The apparatus of claim 32, wherein the first display parameter is a line length and the second display parameter is a maximum number of display lines.

34. The apparatus of claim 33, wherein automatically reformatting comprises:
receiving the line length and the maximum number of display lines; and
re-flowing the message to provide a reformatted message having lines that correspond to the line length.

35. The apparatus of claim 34, wherein re-flowing the message comprises:
populating a current reformatted line within the reformatted message with a current line from the message; and
incrementing to a next reformatted line where insertion of an additional word from the current line would cause the current reformatted line to exceed the line length.

36. The apparatus of claim 35, wherein re-flowing the message further comprises:
continuing to populate the current reformatted line with a next line from the message where the current line is exhausted before the current reformatted line exceeds the line length.

37. The apparatus of claim 36, wherein re-flowing the message further comprises:
determining a paragraph break where the current line is exhausted and the current line is less than a predetermined minimum length.

38. The apparatus of claim 36, wherein re-flowing the message further comprises:
determining a paragraph break where the current line is exhausted and a double line break is found before the next word in the message.

39. The apparatus of claim 31, wherein the user interface is included in a network based customer service system and the reformatted message is saved in a database used by the network based customer service system.

40. The method of claim 31, wherein the first display parameter corresponds to one of a bullet character, tab character and paragraph break.

* * * * *